1,491,903

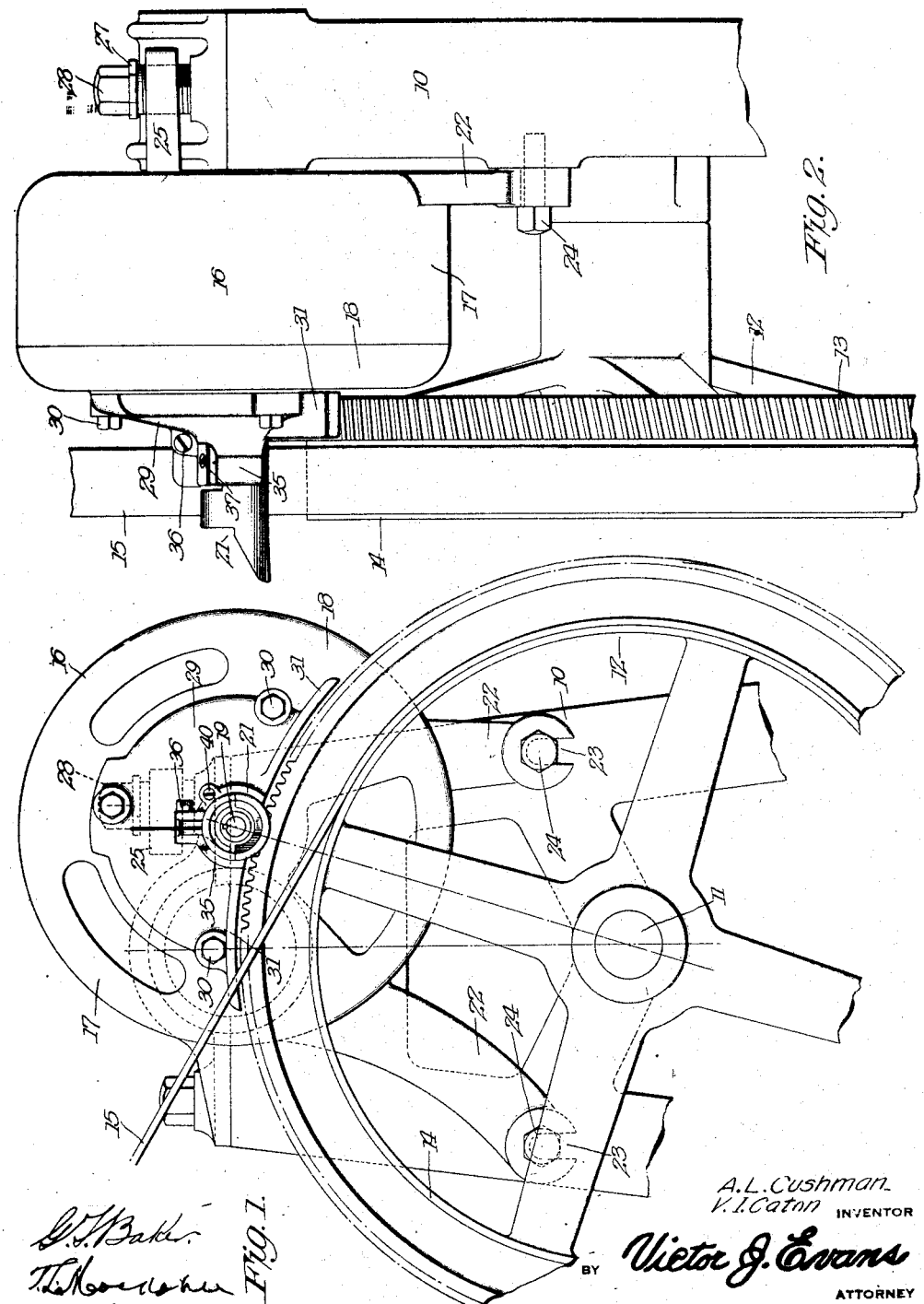

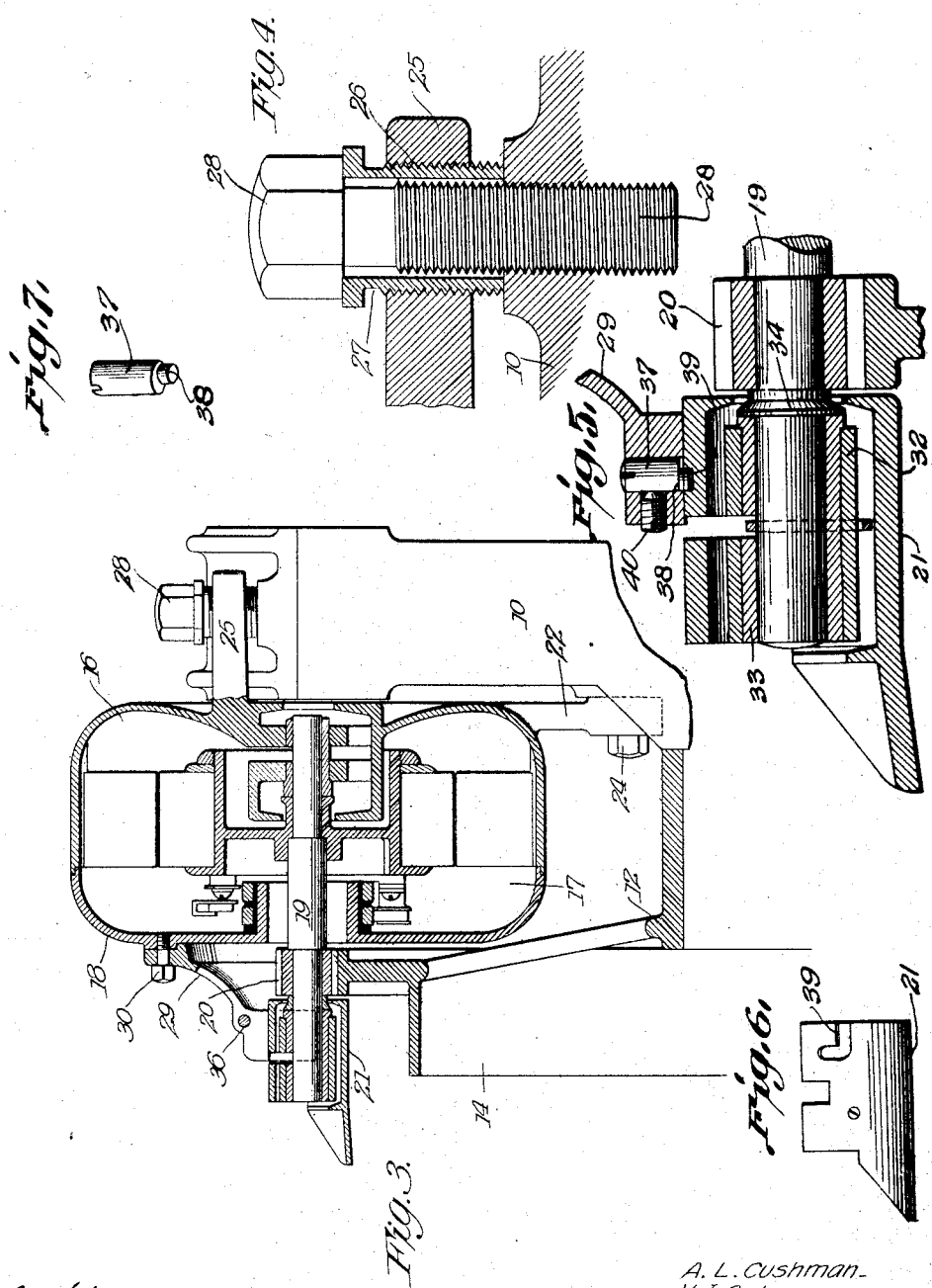
April 29, 1924.
A. L. CUSHMAN ET AL
TYPESETTING MACHINE MOTOR
Filed Feb. 11, 1922
1,491,903
2 Sheets-Sheet 2
A. L. Cushman
V. I. Caton  INVENTOR Patented Apr. 29, 1924.

UNITED STATES PATENT OFFICE.

ABE LINCOLN CUSHMAN AND VERA IRENE CATON, OF CONCORD, NEW HAMPSHIRE; SAID CATON ASSIGNOR, BY MESNE ASSIGNMENTS, TO SAID CUSHMAN.

TYEPSETTING-MACHINE MOTOR.

Application filed February 11, 1922. Serial No. 535,881.

*To all whom it may concern:*

Be it known that we, ABE LINCOLN CUSHMAN and VERA IRENE CATON, citizens of the United States, residing at Concord, in the county of Merrimack and State of New Hampshire, have invented new and useful Improvements in Typesetting-Machine Motors, of which the following is a specification.

This invention relates generally to improvements in type setting machines and specific means for mounting a motor upon the machine to supply power for its operation.

Ordinarily, motors are mounted upon the frame of a type setting machine by means of a four point suspension, two points being provided by connecting the legs of the motor to the machine frame and two by bolting to the frame two ears carried by the motor frame. Should the connection between these ears and the machine frame be unevenly adjusted, or should one of the adjusting bolts be lower than the other, the frame of the motor will be sprung and the motor bearing thrown out of alignment, and frequently, one of the ears will be broken.

These disadvantages are overcome by means of the present invention, which provides a three point suspension, for the motor and permits of the latter being accurately adjusted to properly engage the gears without danger of injury to the motor supporting means.

Another object of the invention is the provision of a motor supporting means which will permit of the frame of the motor being offset with respect to the frame of the type setting machine, so that the distributer belt may pass beneath the front bearing of the motor. In machines where the center of the motor and center of the drive shaft of the type setting machine are not offset, the motor shaft must be of sufficient length to permit the front bearing of the motor to extend outward beyond the outer edge of the distributer belt. This causes vibration of the motor shaft, due to the length of the latter and the engagement of the motor pinion and the driven gear, the result being a constant sparking at the motor brushes.

Another object is the provision of means whereby the front bearing of the motor may be conveniently adjusted longitudinally, so as to take up end thrust or wear, while the construction further permits of this adjustment being made, or the front bearing removed from the motor housing, without in any manner disturbing the motor alignment or effecting the engagement of the motor pinion and the driven gear of the type setting machine.

With the above and other objects in view, the invention further includes the following novel features and details of construction, to be hereinafter more fully described, illustrated in the accompanying drawings and pointed out in the appended claims.

In the drawings:—

Figure 1 is a fragmentary elevation of a portion of the frame of a type setting machine illustrating the invention.

Figure 2 is a similar view at right angles to Figure 1.

Figure 3 is a vertical sectional view.

Figure 4 is an enlarged detail section showing the construction of the adjustable connection between the motor frame and the frame of the type setting machine.

Figure 5 is an enlarged detail section taken transversely of the front bearing.

Figure 6 is a detail elevation of the adjustable front bearing removed from the bearing bracket.

Figure 7 is a detail perspective view of the eccentric pin.

Referring in detail to the drawings, wherein like characters of reference denote corresponding parts, the reference character 10 indicates a portion of the frame of a type setting machine, which usually supports the type setting machine motor and which may be termed the motor bracket. The shaft of the type setting machine extends through this portion of the frame as indicated 11 and has secured thereon, a driving wheel 12. This wheel includes a driving gear 13, while extending from the face of the wheel is a flange, defining a belt pulley 14. Operating over the pulley 14 and driven thereby, is the type setting machine distributer belt 15.

The motor for driving the type setting machine mechanism is indicated at 16 and includes a housing 17 which is closed by a removable cover or cap 18.

In the present invention, the shaft 19 of the motor is offset with respect to the vertical center of the shaft 11, being disposed to one side of and above said shaft. The shaft 19 has secured thereon a driving pinion 20, which engages the gear 13 for operating the wheel 12. The point of engagement between the gear 13 and the pinion 20 is approximately 15 degrees (more or less) to one side of the vertical center of the shaft 11.

By locating the shaft 19 in the position shown, the front bearing of the motor, which is indicated generally at 21, may be arranged above the belt 15 in a manner to provide sufficient room for the operation of the latter. This permits of the use of a relatively short motor shaft and positions the bearing so as to prevent vibration of the shaft and consequent sparking at the brushes of the motor.

For the purpose of supporting the motor upon the machine frame 10, the motor housing 17 is provided with downwardly extending feet 22, whose lower ends are slotted as at 23 so as to receive bolts or screws 24, secured to the frame 10. In addition, the housing 17 has extending rearwardly an arm 25, which is provided with a threaded opening 26. The walls of this opening are engaged by an exteriorly threaded sleeve 27 and passing through this sleeve is a screw or bolt 28, the latter being engaged in the top of the frame 10.

By reference to Figure 4 of the drawings, it will be seen that by loosening the screw 28, the sleeve 27 may be rotated to adjust the arm 25, so that the motor will be moved vertically with respect to the frame 10, this movement being permitted by the manner of engagement between the legs 22 and the bolts 24. By this means adjustment is provided to insure proper engagement between the pinion 20 and the gear 13.

The bearing 21, which is located beyond the gear 20 and which supports the outer end of the shaft 19, is in turn supported by a bracket or plate 29. This bracket or plate is secured to the cap or cover 18 of the motor housing by means of bolts 30. The bracket 29 is further provided with flanges 31 which extend from opposite sides of the bearing 21 and serve as a guard for the gear 13 and pinion 20.

The bearing 21 is of novel construction and includes a sleeve 32, the latter being provided with a bushing 33 which surrounds the outer end of the shaft 19 and bears against an annular flange or collar 34, carried by said shaft, to prevent longitudinal movement of the latter. The bearing 32 is clamped within a split flange 35, which extends from the bracket or plate 29, a clamping screw 36 serving to hold the bearing in proper adjusted position. By loosening the screw, the bearing may be removed without disturbing the adjustment of the pinion 20 and gear 13.

In addition, the bearing 32 is capable of longitudinal adjustment to take up end thrust and wear and for this purpose there is provided a pin 37, which passes through an opening provided in the flange 35 and which is provided at its inner end with an inwardly extending eccentric projection 38. This projection engages the inner end of a right angularly shaped groove 39 provided in the bearing 32, so that by rotating the pin, the bearing will be moved longitudinally of the shaft 19. After proper adjustment of the bearing has been made, the pin 37 is held against movement by means of a set screw 40 which engages said pin. The set screw 36 is then tightened to prevent any movement of said bearing.

The invention is susceptible of various changes in its form, proportions and minor details of construction and the right is herein reserved to make such changes as properly fall within the scope of the appended claims.

Having described the invention what is claimed is:—

1. The combination with a machine, a motor for operating the same and a driving connection between the motor and machine, of a horizontally disposed motor carried arm, means connecting the arm and machine frame, whereby the motor may be adjusted and means also connecting the motor and frame to permit of such adjustment.

2. The combination with a machine, a motor for operating the same and a driving connection between the motor and machine, of means for adjustably mounting the motor upon the frame of the machine, said means including a horizontally disposed motor carried arm, an adjusting sleeve threadedly engaging the arm, a locking bolt freely movable through the sleeve and engaging one end of the latter and a threaded connection between said bolt and machine frame.

3. The combination with a machine, a motor for operating the same, a driving pinion secured to the motor shaft remote from the machine frame and a gear engaging the pinion, of a bearing for supporting the end of the motor shaft beyond the pinion and means whereby the bearing may be removed without disturbing the adjustment between the pinion and gear.

4. The combination with a machine, a motor for operating the same and a driving connection between the motor and machine, of right angularly disposed motor carried arms, means for adjustably securing one of the arms to the machine and means for attaching the other arms to the machine to permit of such adjustment.

5. The combination with a machine, a motor for operating the same and a driving connection between the motor and machine, of a horizontally disposed motor carried arm, means for securing the arm to the machine, whereby the motor may be vertically adjusted and means for attaching the other arms to the machine to permit of such adjustment.

6. The combination with a supporting frame having a shaft journaled therein and a gear wheel on the shaft, of a motor having a pinion for engagement with the gear, a transverse supporting arm on the motor secured to the frame at one side of the vertical plane of the shaft, and upright arms on the motor secured to the frame on opposite sides of said plane to support the motor and prevent twisting movement thereof.

7. The combination with a frame of a shaft journaled therein, a wheel on the shaft having a belt pulley and a driving gear, and a motor on the frame having a shaft extending over the wheel, the shaft having a pinion meshing with the gear and a removable bearing overlying the pulley.

8. A casing for a type setting machine motor having attaching members at one side and a detachable bracket at the opposite side, said bracket supporting a motor shaft bearing in spaced relation to the body of the casing.

9. A casing for a type setting machine motor having attaching members at one side and a detachable bracket at the opposite side, said bracket supporting a motor shaft bearing in spaced relation to the body of the casing, a motor shaft journaled in the casing and in the bearing, and a drive pinion carried by the shaft in the space intermediate the casing proper and the bracket supported bearing.

10. A motor for the purpose set forth including a main frame and a bracket member carried by the frame, a motor shaft journaled in the frame and having a laterally projecting portion provided with a drive pinion, a bearing engaged on the shaft exteriorly of the drive pinion and overlying the latter, and clamp means on the bracket securing the bearing in place.

11. A motor for the purpose set forth including a main frame and a bracket member carried by the frame, a motor shaft journaled in the frame and having a laterally projecting portion provided with a drive pinion, a bearing engaged on the shaft exteriorly of the drive pinion and overlying the latter, and clamp means on the bracket securing the bearing in place, said clamp means partially embracing the bearing but stopping short of the plane of the teeth of the pinion at one side thereof.

12. The combination with a type setting machine including a shaft and a drive wheel for the shaft having a belt pulley and a gear portion adjacent thereto of greater diameter than the belt pulley, of a drive motor for the wheel having a shaft projecting over the gear and pulley portions of the wheel, a pinion on the shaft meshing with the gear, a casing for the motor, interengaging parts on the casing and machine for supporting the motor in place, an extension on the casing overlying the pulley portion of the wheel, and a bearing for the motor shaft carried by the casing and engaging the shaft exterior to the pinion, said bearing depending over the face of the gear above the pulley.

13. The combination with a type setting machine including a shaft and a drive wheel for the shaft having a belt pulley and a gear portion adjacent thereto of greater diameter than the belt pulley, of a drive motor for the wheel having a shaft projecting over the gear and pulley portions of the wheel, a pinion on the shaft meshing with the gear, a casing for the motor, interengaging parts on the casing and machine for supporting the motor in place, an extension on the casing overlying the pulley portion of the wheel, and a bearing for the motor shaft carried by the casing and engaging the shaft exterior to the pinion, said bearing depending over the face of the gear above the pulley, the motor casing having clamp members removably securing the bearing in position, said clamp means stopping short of the tangent plane of the gear whereby on removal of the bearing the gear may be removed from the machine without disturbing the position of the motor.

14. A device of the character described including a supporting frame, a motor housing having parts secured to the frame, a gear wheel rotatably mounted on the frame adjacent the motor casing, and a bracket member carried by the motor casing and overlying the edge of the gear wheel, said bracket member having guard flanges extending along the face of the gear wheel and having a central bearing clamp member, a motor shaft within the housing having a projecting portion overlying the gear, a pinion on the shaft meshing with the gear and a bearing member for the projecting end of the shaft carried by the clamp of the bracket.

15. A casing for a type setting machine motor having a supporting arm projecting parallel with the motor axis and having additional bracing arms projecting substantially radially therefrom.

16. A casing for a type setting machine motor having a supporting arm projecting parallel with the motor axis and having additional bracing arms projecting substantially radially therefrom, the radially projecting arms having fastener receiving slots extending normal to the plane of the supporting arm.

17. In a device of the character described, a motor casing having attaching means at one side and a bracket member at the opposite side, said bracket having a split bearing-receiving clamp and laterally extending guard flanges adjacent the clamp, and a bearing member removably mounted within the clamp and having an outwardly extending bearing protecting flange.

18. A machine of the character described including a frame, a shaft journaled in the frame bearing a combined belt pulley and gear wheel, and a motor carried by the frame having a pinion in mesh with the gear wheel and a projecting shaft portion overlying the belt pulley, the motor including a housing and a bracket carried by the housing, said bracket having flange portions overlying the gear and pinion to provide a guard therefor and having a bearing supporting clamp, and a bearing member for the projecting portion of the motor shaft removably mounted in the clamp, said bearing member overlying the belt pulley and having a guard portion to prevent matter thrown off by the belt from reaching the bearing.

19. A motor for a type setting machine including a housing having a projecting arm adapted to be secured in horizontal position to the frame of the machine, and arms carried by the housing in a plane at right angles to that of the first arm, said arms having fastener receiving slots formed therein and disposed perpendicularly to the plane of the first arm whereby the first arm may be vertically adjusted as respects the machine frame and the fasteners will ride in the slots of the frame arms during such adjustment.

20. In combination with a type setting machine having a shaft projecting outwardly therefrom at one end, a pulley and gear on said projecting shaft, and a belt extending from said pulley in a plane intersecting the vertical axial plane of said shaft approximately at the periphery of said gear, of a motor mounted on said end of the machine with its shaft extending across the plane of said pulley, and means for mounting said motor in a position laterally offset from said vertical axial plane to provide clearance between said belt and said motor shaft, said means comprising a plurality of arms extending from the motor casing along the machine frame.

In testimony whereof we affix our signatures.

ABE LINCOLN CUSHMAN.
VERA IRENE CATON.